US012561056B2

(12) United States Patent
Lee

(10) Patent No.: US 12,561,056 B2
(45) Date of Patent: Feb. 24, 2026

(54) ELECTRONIC DEVICE, METHOD, AND COMPUTER-READABLE STORAGE MEDIUM FOR CHANGING TRAJECTORY OF GESTURE

(71) Applicant: Samsung Electronics Co., Ltd., Suwon-si (KR)

(72) Inventor: Jiwon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/061,621

(22) Filed: Feb. 24, 2025

(65) Prior Publication Data

US 2025/0190104 A1 Jun. 12, 2025

Related U.S. Application Data

(63) Continuation of application No. PCT/KR2023/011710, filed on Aug. 8, 2023.

(30) Foreign Application Priority Data

Aug. 29, 2022 (KR) ........................ 10-2022-0108768
Sep. 30, 2022 (KR) ........................ 10-2022-0125306
Oct. 18, 2022 (KR) ........................ 10-2022-0134475

(51) Int. Cl.
G06F 3/04883 (2022.01)
G06F 3/041 (2006.01)

(52) U.S. Cl.
CPC .......... *G06F 3/04883* (2013.01); *G06F 3/041* (2013.01)

(58) Field of Classification Search
CPC ... G02F 1/1333; H10K 59/40; G06F 3/04883; G06F 3/041; G06F 2203/04808
See application file for complete search history.

(56) References Cited

U.S. PATENT DOCUMENTS 8,479,122 B2 7/2013 Hotelling et al.
8,878,800 B2 11/2014 Suzuki et al.
(Continued)

FOREIGN PATENT DOCUMENTS

JP 2012198596 A 10/2012
JP 2015043139 A 3/2015
(Continued)

OTHER PUBLICATIONS

International Search Report for PCT/KR2023/011710 mailed Nov. 28, 2023, 5 pages with English translation.

*Primary Examiner* — Yaron Cohen
(74) *Attorney, Agent, or Firm* — Nixon & Vanderhye, P.C.

(57) ABSTRACT

An example electronic device may include a touch sensor and a processor. Based on a touch input at a plurality of contact points contacted on the touch sensor, the processor can identify the distance between the plurality of contact points and the center point of the plurality of contact points. Based on a speed of the center point due to the movement of the contact points, the processor can obtain a probability that the touch input corresponds to a first designated gesture associated with the distance and a probability that the touch input corresponds to a second designated gesture associated with the movement of the center point. The processor can change at least one of the distance or the center point based on the probabilities.

20 Claims, 8 Drawing Sheets

(56) References Cited

U.S. PATENT DOCUMENTS

| 8,913,032 | B2 | 12/2014 | Kikuchi |
| 9,128,527 | B2 | 9/2015 | Kim et al. |
| 9,218,121 | B2 | 12/2015 | Chang et al. |
| 9,594,457 | B2 | 3/2017 | Townsend et al. |
| 9,665,201 | B2 | 5/2017 | Yamamoto |
| 2013/0120282 | A1 | 5/2013 | Kukulski |
| 2013/0215034 | A1* | 8/2013 | Oh et al. |
| 2014/0320457 | A1* | 10/2014 | Chen .................... G06F 3/0421 |
| | | | 345/173 |
| 2017/0003853 | A1 | 1/2017 | Min et al. |

FOREIGN PATENT DOCUMENTS

| KR | 101171623 | B1 | 8/2012 |
| KR | 20120114163 | A | 10/2012 |
| KR | 101199970 | B1 | 11/2012 |
| KR | 20170002902 | A | 1/2017 |
| KR | 20230022766 | A | 2/2023 |

* cited by examiner

100

200

250

ELECTRONIC DEVICE, METHOD, AND COMPUTER-READABLE STORAGE MEDIUM FOR CHANGING TRAJECTORY OF GESTURE

CROSS-REFERENCE TO RELATED APPLICATIONS

This application is a continuation of International Application No. PCT/KR2023/011710, designating the United States, filed on Aug. 8, 2023, in the Korean Intellectual Property Receiving Office and claiming priority to Korean Patent Application Nos. 10-2022-0108768, filed on Aug. 29, 2022; 10-2022-0125306, filed on Sep. 30, 2022; and 10-2022-0134475, filed on Oct. 18, 2022, in the Korean Intellectual Property Office, the disclosures of each of which are incorporated by reference herein in their entireties.

BACKGROUND

Field

The disclosure relates to an electronic device, a method, and a computer-readable storage medium for changing a trajectory of a gesture.

Description of Related Art

Recently, the spread of various types of a portable electronic devices, such as smartphones, a tablet PCs, wireless earphones, and smart watches, is expanding. Such portable electronic devices may receive one or more touch inputs using a touch sensor. The portable electronic device may identify a gesture using the received one or more touch inputs based on a specified time interval. The portable electronic device may identify various gestures based on the number of times, a trajectory, and/or the count of the received one or more touch inputs.

SUMMARY

An electronic device according to an example embodiment may include a touch sensor and at least one processor (including, e.g., processing circuitry). The processor may be configured to, based on a touch input at a plurality of contact points contacted on the touch sensor, identify a distance between the plurality of contact points, and a center point of the plurality of contact points; based on a speed of the center point by a movement of the contact points, obtain probabilities in which the touch input may correspond to each of a first specified gesture related to the distance and a second specified gesture related to a movement of the center point; and based on the probabilities, change at least one of the distance or the center point.

A method of an electronic device according to an example embodiment may include, based on a touch input at a plurality of contact points contacted on a touch sensor, identifying a distance between the plurality of contact points, and a center point of the plurality of contact points; based on a speed of the center point by a movement of the contact points, obtaining probabilities in which the touch input corresponds to each of a first specified gesture related to the distance and a second specified gesture related to a movement of the center point; and based on the probabilities, changing at least one of the distance or the center point.

One or more programs of one or more computer-readable storage media storing the one or more programs according to an example embodiment may be configured to, when executed by at least one processor (including, e.g., processing circuitry) of an electronic device perform operations including, based on a touch input at a plurality of contact points contacted on a touch sensor, identifying a distance between the plurality of contact points, and a center point of the plurality of contact points; based on speed of the center point by a movement of the contact points, obtain probabilities in which the touch input corresponds to each of a first specified gesture related to the distance and a second specified gesture related to a movement of the center point; and based on the probabilities, change at least one of the distance or the center point.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
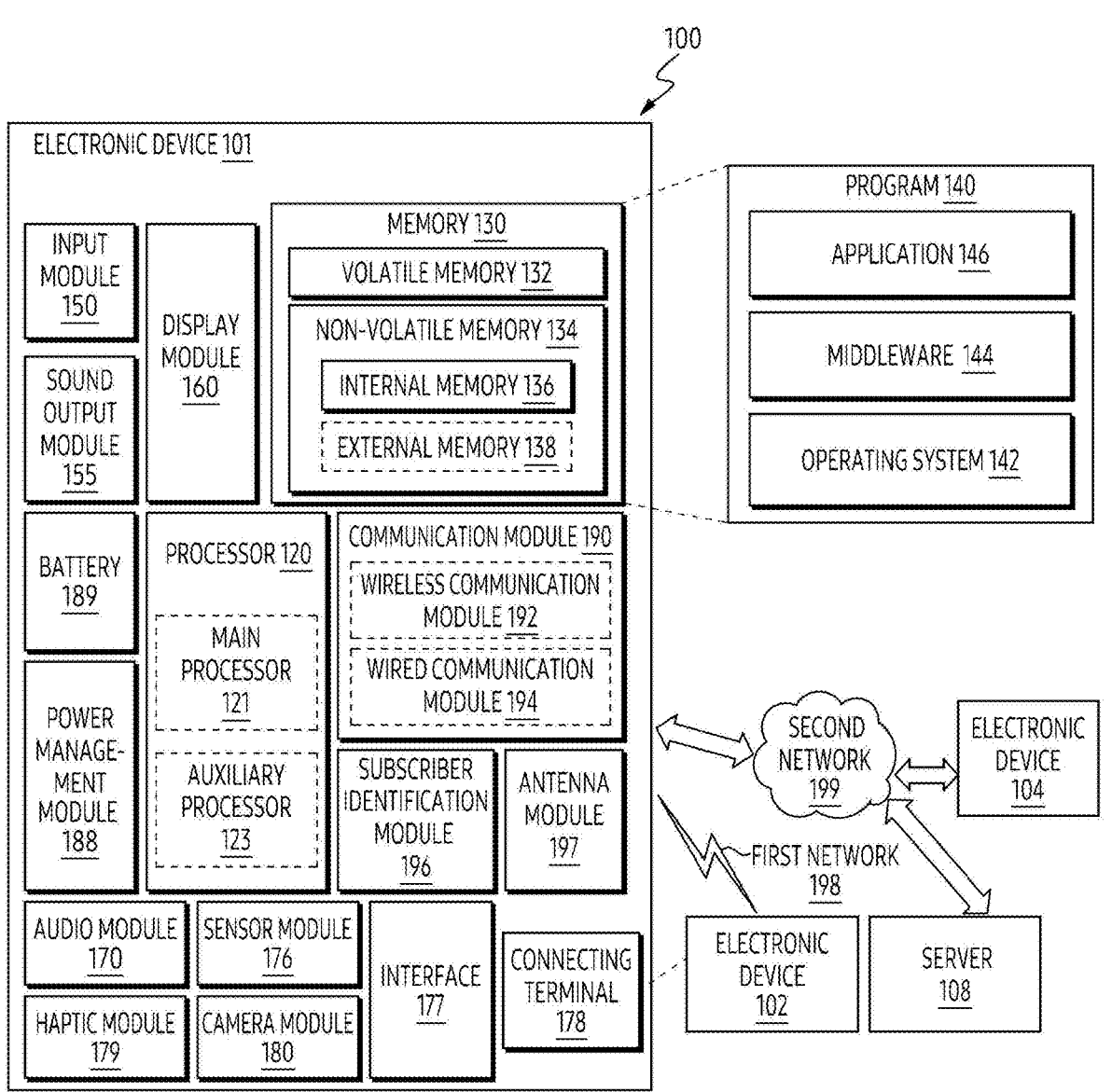
FIG. 1 is a block diagram of an example electronic device in a network environment, according to various embodiments.

The various example embodiments of the present disclosure and terms used herein are not intended to limit the technology described in the present disclosure to specific embodiments, and should be understood to include various modifications, equivalents, or substitutes of the corresponding example embodiments. In relation to the description of the drawings, a same reference numeral may be used for a similar component. A singular expression may include a plural expression unless it is clearly meant differently in the context. In the present disclosure, an expression such as "A or B", "at least one of A and/or B", "A, B or C", or "at least one of A, B and/or C", and the like may include all possible combinations of items listed together. Expressions such as "1st", "2nd", "first" or "second", and the like may modify corresponding components regardless of order or importance and are only used to distinguish one component from another component, not to limit the corresponding components. When a (e.g., first) component is referred to as "connected (functionally or communicatively)" or "accessed" to another (e.g., second) component, the component may be directly connected to the other component or may be connected through another component (e.g., a third component).

The term "module" used in the present document may include a unit configured with hardware, software, or firmware, or any combination thereof, and may be used interchangeably with terms such as logic, logic block, component, or circuit, and the like. The module may be an integrally configured component or a minimum unit or part thereof that performs one or more functions. For example, a module may be configured with an application-specific integrated circuit (ASIC).

Hereinafter, various example embodiments of the present disclosure will be described with reference to the accompanying drawings.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 (including, e.g., processing circuitry) may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, the various processors may operate individually or collectively to perform operations or functions. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 (including, e.g., input circuitry) may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 (including, e.g., sound output circuitry) may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 (including, e.g., audio circuitry) may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 (including, e.g., interface circuitry) may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via tactile sensation or kinesthetic sensation. According to an embodiment, the haptic module 179 may include, for example, a motor, a piezoelectric element, or an electric stimulator.

The camera module 180 (including, e.g., a camera) may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 (including, e.g., communication circuitry) may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (including, e.g., wireless communication circuitry) (e.g., a cellular communication module, a short-range wireless communication module, or a global navigation satellite system (GNSS) communication module) or a wired communication module 194 (including, e.g., wired communication circuitry) (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of lms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, where the term "non-transitory" refers to the storage medium being a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the described in this disclosure may include a single entity or multiple entities, and some of the multiple entities may be separately disposed in different components. According to various embodiments, one or more of the components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
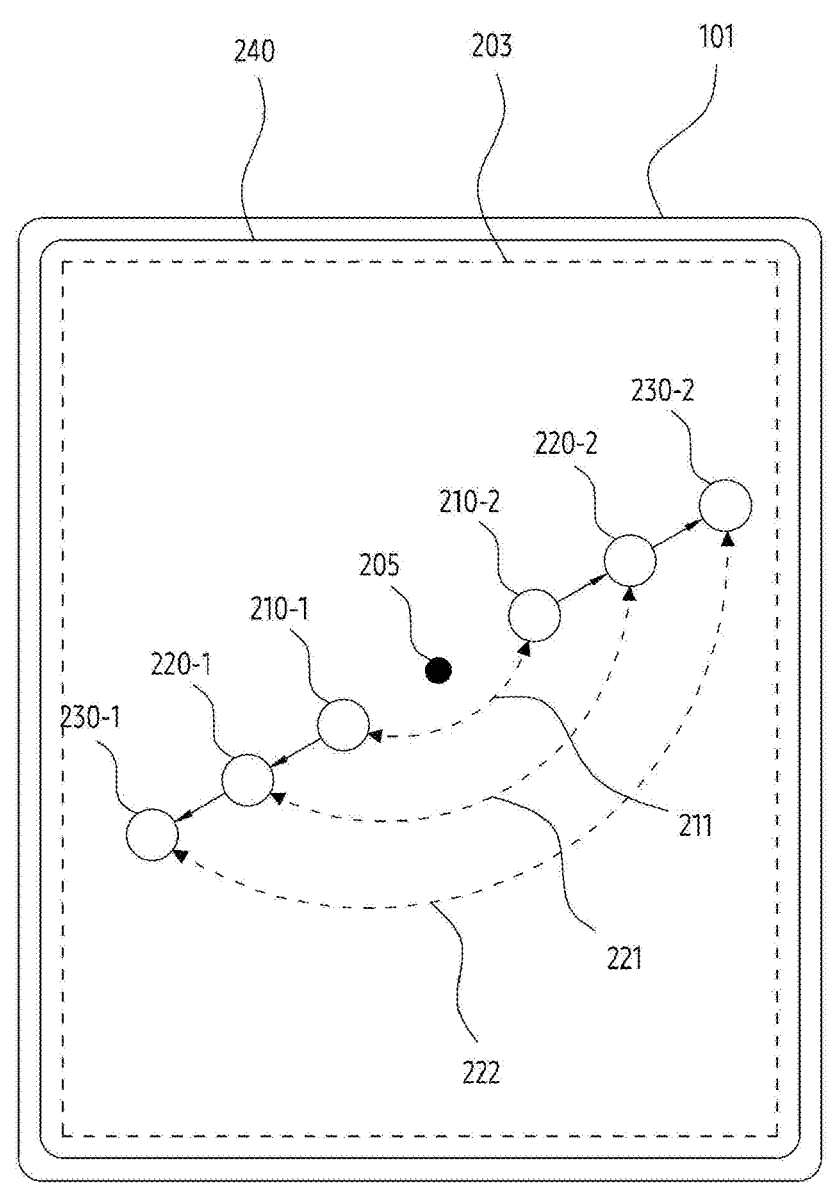
FIGS. 2A to 2B are views illustrating an example gesture corresponding to an input, according to various embodiments.
Figure 2B:
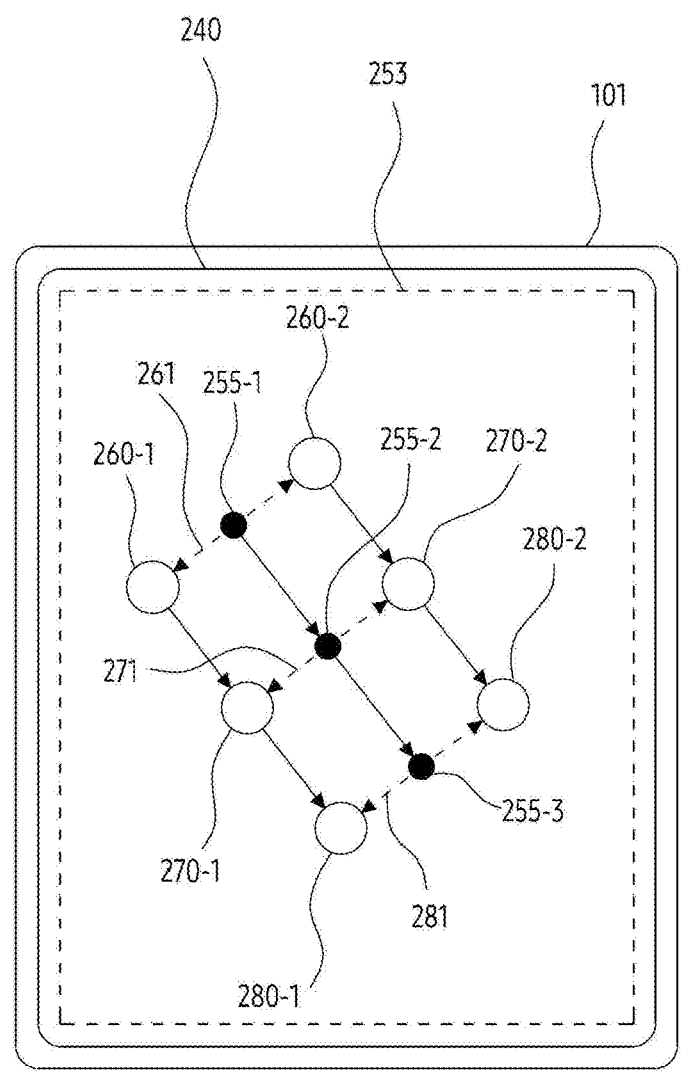

FIGS. 2A and 2B are views illustrating an example gesture corresponding to an input, according to various embodiments. Referring to FIGS. 2A to 2B, an electronic device 101 for identifying the gesture corresponding to the input at a plurality of contact points according to an embodiment is illustrated. The electronic device 101 may include or correspond to the electronic device of FIG. 1. A display 240 may include o correspond to the display module 160 of FIG. 1.

Referring to FIG. 2A, in a state 200, the electronic device 101 according to an embodiment may receive touch inputs at the plurality of contact points on the display 240. For example, the electronic device 101 may identify a gesture 203 corresponding to the received touch inputs. The gesture 203 may be identified, for example, based on touch inputs following a specified trajectory. The trajectory may be referred to as a path. The trajectory identified by the electronic device 101 may be one or more. For example, the electronic device 101 may identify the specified trajectory, by identifying the path of the touch inputs. For example, the specified trajectory may include the touch inputs at the plurality of contact points. For example, the electronic device 101 may identify a type of a gesture based on the touch inputs following the specified trajectory. The type of gesture will be described below with reference to FIG. 3.

The electronic device 101 according to an embodiment may identify a touch input according to the specified trajectory (or pattern) based on a specified time interval (e.g., 8 ms or 16 ms). For example, the electronic device 101 may identify a touch input corresponding to contact points 210. For example, in response to identifying the touch input at the contact points 210, the electronic device 101 may perform an operation for identifying the touch input based on the specified time interval. As an example, the touch input at the contact points 210 may be referred to as contact points indicating a contact with an external object.

For example, the electronic device 101 may identify touch inputs corresponding to a position of each of the contact points 210, based on the specified time interval. For example, the electronic device 101 may identify a touch input corresponding to a contact point 210-1 and/or a contact point 210-2 at a first time point. The electronic device 101 may identify a touch input corresponding to a contact point 220-1 and/or a contact point 220-2 at a second time point. The electronic device 101 may identify a touch input corresponding to a contact point 230-1 and/or a contact point 230-2 at a third time point.

For example, based on a distance between the contact point 210-1 and the contact point 220-1, and the specified time interval, the electronic device 101 may identify the touch input corresponding to the contact point 210-1, the touch input corresponding to the contact point 220-1, and/or the touch input corresponding to the contact point 230-1 as a first index. Based on identifying each of the touch inputs as the first index, the electronic device 101 may identify a first specified trajectory using the touch input corresponding to the contact point 210-1, the contact point 220-1, and/or the contact point 230-1.

For example, the electronic device 101 may identify each of the touch inputs by the contact point 210-2, the contact point 220-2, and/or the contact point 230-2 as a second index. For example, the electronic device 101 may identify a second specified trajectory using the touch input by the contact point 210-2, the contact point 220-2, and/or the contact point 230-2.

The electronic device 101 according to an embodiment may identify a center point (pivot) 205 and/or a distance 211 between contact points 210 based on the identified touch input. For example, the center point 205 may correspond to a position between the contact points 210. As an example, the center point 205 may be positioned at a half point between the contact points 210.

The electronic device 101 according to an embodiment may identify a change in the distance 211 based on identifying the touch input at the contact points 210. For example, the electronic device 101 may identify the touch input corresponding to contact points 220 and/or contact points 230, based on the specified time interval.

For example, the electronic device 101 may identify a distance 221 between the contact points 220 and/or a distance 222 between the contact points 230. For example, the electronic device 101 may identify center points corresponding to each of the distance 221 and the distance 222 while identifying the distance 221 and/or the distance 222. As an example, the center points may correspond to the center point 205. For example, the specified time interval may be 8 ms and/or 16 ms. However, it is not limited thereto.

The electronic device 101 according to an embodiment may identify the gesture 203 using each of the touch inputs by the contact points 210, 220, and 230. For example, the gesture 203 may be identified based on identifying the first specified trajectory including the touch inputs by the contact points 210-1, 220-1, and 230-1, and/or the second specified trajectory including the touch inputs by the contact points 210-2, 220-2, and 230-2. The gesture 203 may be referred to as a pinch-zoom gesture. The electronic device 101 may perform an event corresponding to the gesture 203 based on identifying the gesture 203. The event may be an example of an event indicating an enlargement of a screen in which the electronic device 101 displays on the display 240. For example, the event may be an example of an event indicating an enlargement of content (e.g., an image) in which the electronic device 101 displays on the display 240.

For example, the electronic device 101 may identify touch inputs based on the specified trajectory, from the contact points 230 to the contact points 210, with respect to the center point 205. The electronic device 101 may identify a specified gesture (e.g., a zoom-in gesture) based on the identified touch inputs (or the specified trajectory). Based on the identified specified gesture, the electronic device 101 may perform an event indicating a reduction of the screen or a reduction of the content (e.g., the image), displayed on the display 240. However, it is not limited thereto.

The electronic device 101 according to an embodiment may identify a movement of the center point 205 while identifying the touch inputs according to the specified trajectory. As an example, based on identifying the movement of the center point 205 to be below a specified distance, the electronic device 101 may identify a pinch-zoom gesture. As an example, the electronic device 101 may identify a scroll gesture different from the pinch-zoom gesture, based on identifying the movement of the center point 205 to be greater than or equal to the specified distance. For example, the electronic device 101 may identify an intention of a user, based on the movement of the center point 205 and/or an amount of change in a distance between contact points. The electronic device 101 may use data indicating a probability, in order to identify the intention of the user. An operation in which the electronic device 101 identifies a gesture corresponding to the user intention using the data will be described below with reference to FIG. 4.

Referring to FIG. 2B, in a state 250, the electronic device 101 according to an embodiment may identify touch inputs by contact points 260. For example, in response to identifying the touch inputs by the contact points 260, the electronic device 101 may identify touch inputs by contact points 270 and 280 different from the contact points 260 based on the specified time interval. For example, the electronic device 101 may identify a touch input by a contact point 260-1 at a first time point. The electronic device 101 may identify a touch input by a contact point 270-1 at a second time point. The electronic device 101 may identify a touch input by a contact point 280-1 at a third time point. For example, the electronic device 101 may identify a movement of the contact points 260, 270, and 280 based on identifying the touch inputs.

For example, the electronic device 101 may identify the touch inputs by each of the contact points 260-1, 270-1, and 280-1 as a first index, based on the specified time interval and/or a distance between the contact points 260-1, 270-1, and 280-1. For example, the electronic device 101 may identify a first specified trajectory using positions of the contact points 260-1, 270-1, and 280-1, based on identifying as the first index.

For example, the electronic device 101 may identify each of touch inputs by contact points 260-2, 270-2, and 280-2 as a second index. The electronic device 101 may identify a second specified trajectory using positions of the contact points 260-2, 270-2, and 280-2, based on identifying as the second index. For example, based on identifying the first specified trajectory and/or the second specified trajectory, the electronic device 101 may identify a gesture 253.

The electronic device 101 according to an embodiment may identify center points 255 and/or distances 261, 271, and 281, corresponding to each of the contact points 260, 270, and 280. The electronic device 101 may identify a distance of each of the contact points 260, 270, and 280 while identifying positions of the contact points 260, 270, and 280. For example, the electronic device 101 may identify the distance 261, the distance 271, and/or the distance 281, respectively, based on the specified time interval. For example, each of the distances 261, 271, and 281 may be substantially similar.

For example, the electronic device 101 may identify the center points 255 while identifying each of the contact points 260, 270, and 280. For example, the center points 255 may be obtained based on each of the contact points 260, 270, and 280. For example, a center point 255-1 may correspond to a position between the contact points 260. For example, a center point 255-2 may correspond to a position between the contact points 270. For example, a center point 255-3 may correspond to a position between the contact points 280. For example, each of the center points 255 may be disposed at a center of a distance between the contact points 260, 270, and 280. However, it is not limited thereto.

For example, the electronic device 101 may identify a movement of the center point 255 based on the specified trajectory. Based on the identified movement of the center point 255, the electronic device 101 may identify speed at which the center point 255 is moved. Based on the identified speed, the electronic device 101 may infer a user intention. An operation in which the electronic device 101 identifies the user intention will be described below with reference to FIG. 4.

The electronic device 101 according to an embodiment may identify the gesture 253 based on identifying the specified trajectory. For example, the specified trajectory may include the first specified trajectory based on the touch inputs by the contact points 260-1, 270-1, and 280-1, and/or the second specified trajectory based on the touch inputs by the contact points 260-2, 270-2, and 280-2. The gesture 253 may be, for example, a two-hand scroll gesture. As an example, the electronic device 101 may perform an operation indicating a scroll of a screen displayed on the display 240 based on identifying the two-hand scroll gesture. However, it is not limited thereto.

Referring to FIGS. 2A and 2B, the electronic device 101 according to an embodiment may identify touch inputs during the specified time interval. The electronic device 101 may identify a specified trajectory using the touch inputs. The electronic device 101 may identify a specified gesture (e.g., the gesture 203 or the gesture 253) based on the specified trajectory. For example, the specified gesture that the electronic device 101 identifies based on the specified trajectory may be one or more. For example, the electronic device 101 may identify a contact point based on identifying a touch input at one or more contact points (e.g., the contact points 210 of FIG. 2A and/or the contact points 260 of FIG. 2B) at the first time point. Based on identifying the contact point, the electronic device 101 may infer one or more specified gestures.

For example, the electronic device 101 may perform an operation corresponding to a first gesture among the one or more specified gestures. The electronic device 101 may use data indicating a probability related to the one or more specified gestures in order to perform an operation corresponding to the one gesture. Using the data, the electronic device 101 may select the first gesture from among the one or more specified gestures. For example, the electronic device 101 may identify the first gesture using a movement of the center point 205 or 255, speed at which the center point 205 or 255 is moved, and/or a change in a distance between contact points. As the electronic device 101 selects the one gesture, the electronic device 101 may change at least a portion of the center point and the distance obtained based on the touch input according to the specified trajectory. An operation in which the electronic device 101 changes the at least a portion will be described below with reference to FIG. 6.

As described above, the electronic device 101 may identify one or more touch inputs corresponding to a plurality of contact points using at least one sensor. For example, the electronic device 101 may identify the identified one or more touch inputs according to the specified trajectory. For example, based on identifying the one or more of the touch inputs, a user intention to input the specified gesture may be inferred. For example, the electronic device 101 may use probability data to infer the user intention. The probability data may refer, for example, to data indicating a probability that the specified gesture matches the user intention. The electronic device 101 may change at least a portion of the center point and/or the distance corresponding to each of the plurality of contact points using the probability data. Based on changing the at least a portion, the electronic device 101 may perform an operation corresponding to the specified gesture to be suitable to the user intention. Hereinafter, in FIG. 3, a simplified block diagram of the electronic device 101 will be described below.

Figure 3:
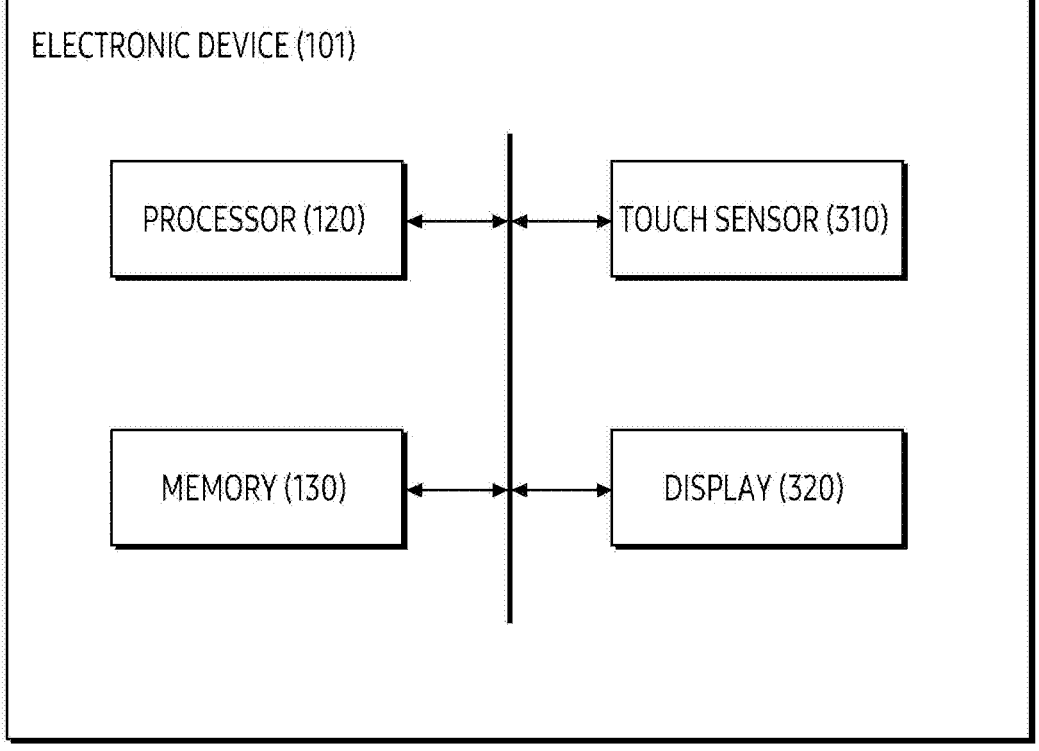
FIG. 3 is a block diagram of an example electronic device according to various embodiments.

FIG. 3 is a block diagram of an example electronic device according to various embodiments. Referring to FIG. 3, an electronic device 101 may be an example of the electronic device 101 of FIG. 1 and/or the electronic device 101 of FIG. 2. Referring to FIG. 3, the electronic device 101 according to an embodiment may include at least one of at least one processor 120, memory 130, a touch sensor 310, and/or a display 320. The processor 120, the memory 130, the touch sensor 310, and the display 320 may be electronically and/or operably coupled with each other by an electronic component such as a communication bus. A type and/or a number of hardware components included in the electronic device 101 is not limited to the arrangement illustrated in FIG. 3. For example, the electronic device 101 may include only a portion of the hardware components illustrated in FIG. 3.

The at least one processor 120 (including, e.g., processing circuitry) of the electronic device 101 according to an embodiment may include a hardware component for processing data based on one or more instructions. For example, the hardware component for processing the data may include an arithmetic and logic unit (ALU), a field programmable gate array (FPGA), an application processor (AP), a communication processor (CP), a graphics processing unit (GPU), and/or a central processing unit (CPU). The number of processors 120 may be one or more. For example, the processor 120 may have a structure of a multi-core processor such as a dual core, a quad core, or a hexa core.

The memory 130 of the electronic device 101 according to an embodiment may include a hardware component for storing data and/or instructions inputted and/or outputted to the processor 120. The memory 130 may include, for example, a volatile memory such as random-access memory (RAM) and/or a non-volatile memory such as a read-only memory (ROM). The volatile memory may include, for example, at least one of a dynamic RAM (DRAM), a static RAM (SRAM), a cache RAM, or a pseudo SRAM (PSRAM). The non-volatile memory may include, for example, at least one of a programmable ROM (PROM), an erasable PROM (EPROM), an electrically erasable PROM (EEPROM), a flash memory, a hard disk, a compact disk, or an embedded multimedia card (eMMC).

In the memory 130 of the electronic device 101 according to an embodiment, one or more instructions indicating an operation to be performed on data by the processor 120 may be stored. A set of instructions may be referred to as firmware, an operating system, a process, a routine, a sub-routine and/or an application. For example, the processor 120 of the electronic device 101 and/or the electronic device 101 may perform an operation of FIG. 7 by executing a set of a plurality of instructions distributed in a form of an application. Hereinafter, an application being installed in the electronic device 101 may refer, for example, to one or more instructions provided in the form of the application which are stored in the memory 130 of the electronic device 101, and the one or more applications may be stored in an executable format (e.g., a file with an extension specified by the operating system of the electronic device 101). The electronic device 101 according to an embodiment may provide an operation based on a specified gesture to a user, using at least one of the one or more applications.

The display 320 according to an embodiment may output visualized information to the user by being controlled by a controller such as the processor 120. The display 320 may include a flat panel display (FPD) and/or an electronic paper. The FPD may include a liquid crystal display (LCD), a plasma display panel (PDP), and/or one or more light emitting diodes (LEDs). The LED may include an organic LED (OLED).

According to an embodiment, the display 320 may include the touch sensor 310 (e.g., a touch sensor panel (TSP)) for detecting an external object (e.g., a finger of the user) on the display 320. However, it is not limited thereto. For example, the touch sensor 310 may be included in the electronic device 101 independently of the display 320. For example, based on the touch sensor 310, the electronic device 101 may detect an external object (e.g., a stylus) contacting on the display 320 or floating on the display 320. The processor 120 may identify at least one touch input based on the detected external object. For example, based on the at least one touch input identified using touch sensor 310, the processor 120 may identify at least one of information on extent where the at least one touch input is performed, information on speed at which the at least one touch input is performed, and information on a direction in which the at least one touch input is performed. As an example, the processor 120 may identify at least one specified trajectory based on the at least one touch input using the touch sensor 310. The processor 120 may identify at least one gesture based on the identified at least one specified trajectory.

For example, the touch sensor 310 of the electronic device 101 may be configured with a plurality of layers. For example, the touch sensor 310 may include a drive electrode, a dielectric, and/or a sense electrode. For example, the touch sensor 310 may identify a changed capacitance value in a plurality of areas (e.g., the contact points 210 of FIG. 2A) where the drive electrode and the sense electrode cross each other. As an example, the touch sensor 310 may identify a capacitance value between the drive electrode and the sense electrode. The touch sensor 310 may identify the capacitance value between the drive electrode and the sense electrode that is changed based on a touch input.

According to an embodiment, the touch sensor 310 may transmit data on the identified capacitance value to the processor 120. The processor 120 may receive the data from the touch sensor 310. The processor 120 may identify information on a user input (or trajectory) based on the data.

According to an embodiment, the user input may be configured with at least one touch input. For example, the processor 120 may identify touch inputs identified from a time point when the user input starts to a time point when the user input is released as the at least one touch input. For example, the processor 120 may identify the touch inputs based on a specified time interval from the time point when the user input starts to the time point when the user input is released. The processor 120 may identify the identified touch inputs as at least one gesture. As an example, the processor 120 may identify the at least one gesture (e.g., the gesture 203 of FIG. 2A or the gesture 253 of FIG. 2B) by identifying the user input according to a predefined period.

A gesture identified by the electronic device 101 according to an embodiment may be one or more. For example, the gesture may include at least one of a tap gesture, a drag gesture, a swipe gesture, a pinch-zoom gesture, and/or a scroll gesture. As an example, the electronic device 101 may initiate execution of content based on identifying the tap gesture for the content in a screen displayed on the display 320. As an example, the electronic device 101 may move the content in the screen based on identifying the drag gesture for the content included in the screen. As an example, the electronic device 101 may reduce and/or enlarge the screen displayed in the display 320 based on identifying a pinch gesture. As an example, the electronic device 101 may scroll the screen displayed in the display 320 based on identifying the scroll gesture.

The electronic device 101 according to an embodiment may identify touch inputs at a plurality of contact points based on the specified trajectory using the touch sensor 310. The electronic device 101 may identify a plurality of gestures in response to identifying the touch inputs. The electronic device 101 may identify that one of the plurality of gestures matches a user intention. The electronic device 101 may use data related to the one gesture to identify that the one gesture matches the user intention. The data may include a probability for the gesture corresponding to the specified trajectory. The electronic device 101 may perform an operation suitable for the user intention based on identifying the one gesture matching the user intention by using the data.

As described above, the electronic device 101 according to an embodiment may identify a plurality of external objects contacted on the display 320 by using the touch sensor 310. The electronic device 101 may infer motion of the plurality of external objects based on identifying the plurality of external objects. As an example, the electronic device 101 may identify that the plurality of external objects respectively move in different directions with respect to a point. As an example, the electronic device 101 may identify that the plurality of external objects move based on the same direction. For example, the electronic device 101 may identify a gesture based on a direction in which the plurality of external objects move.

For example, the electronic device 101 may change a portion of a trajectory corresponding to the identified gesture to perform an operation based on the identified gesture. As an example, a distance between contact points in contact with the plurality of external objects may be changed. As an example, a center point positioned at a point between the contact points may be changed. For example, the electronic device 101 may prevent a performance of an operation that the user does not intend by changing the portion of the trajectory. For example, the electronic device 101 may perform, in a visually natural way, an operation corresponding to the gesture by changing the portion of the trajectory. The electronic device 101 may use probability data for inferring the motion of the plurality of external objects, in order to perform an operation matching the user intention. Hereinafter, in FIG. 4, an operation in which the electronic device 101 identifies a gesture using the probability data will be described below.

Figure 4:
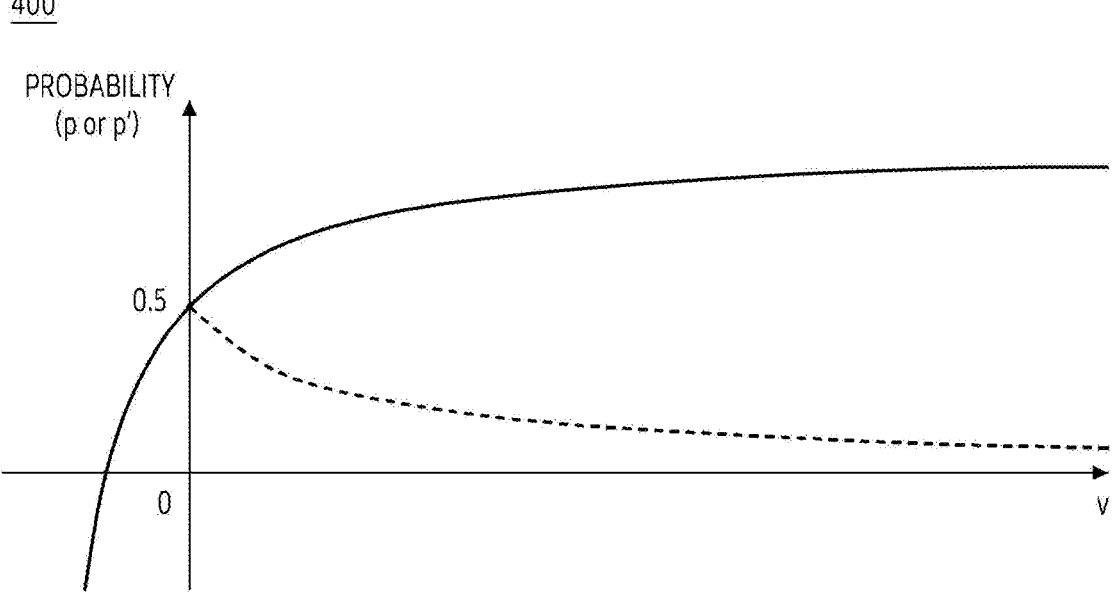
FIG. 4 is a graph illustrating a probability with respect to a gesture identified by an example electronic device according to various embodiments.

FIG. 4 is a graph illustrating a probability with respect to a gesture identified by an example electronic device according to various embodiments. Referring to FIG. 4, a graph 400 indicating a probability that an electronic device 101 according to an embodiment identifies a gesture corresponding to a touch input at a plurality of contact points is illustrated. The graph 400 may indicate a probability (e.g., p or p' of FIG. 4) in which the gesture corresponding to the input at the plurality of contact points matches a user intention based on moving speed (e.g., v of FIG. 4) of a center point (e.g., the center point 205 of FIG. 2A). For example, the probability may correspond to one of values 0 to 1. The electronic device 101 corresponding to FIG. 4 may be an example of the electronic device 101 of FIG. 1 and/or the electronic device 101 of FIG. 2A.

Referring to the graph 400 according to an embodiment, based on the touch input at the plurality of contact points contacted on a touch sensor (e.g., the touch sensor 310 of FIG. 3), the electronic device 101 may identify a distance (e.g., the distance 211 of FIG. 2A) between the plurality of contact points and a center point (e.g., the center point 205 of FIG. 2A) of the plurality of contact points. For example, the electronic device 101 may obtain a probability corresponding to a plurality of gestures based on identifying the touch input at the plurality of contact points.

For example, based on the speed of the center point by a movement of the contact points, the electronic device 101 may obtain probabilities in which the touch input corresponds to each of a first gesture related to a movement of the center point and/or a second gesture related to the distance. However, it is not limited thereto. As an example, the electronic device 101 may obtain the probabilities by identifying the distance between the plurality of contact points.

For example, the electronic device 101 may identify the speed of the center point by identifying the movement of the contact points based on a specified time interval. For example, a probability corresponding to the first gesture may be indicated by a first graph 410. For example, a probability corresponding to the second gesture may be indicated by a second graph 420. As an example, the first gesture may be referred to as a two-hand scroll gesture (e.g., the gesture 253 of FIG. 2B). As an example, the second gesture may be referred to as a pinch-zoom gesture (e.g., the gesture 203 of FIG. 2A).

For example, in a case that the moving speed of the center point is 0, the electronic device 101 may identify the probabilities in which the touch inputs at the plurality of contact points correspond to each of the first gesture and the second gesture, with the same probability (e.g., 0.5). However, it is not limited thereto.

The first graph 410 according to an embodiment may be an example of a graph that is proportional to the moving speed (e.g., the v of FIG. 4) of the center point. For example, referring to the first graph 410, as the moving speed of the center point increases, the probability in which the touch input by the plurality of contact points is identified as the first gesture may increase. For example, based on identifying that the moving speed of the center point increases, the electronic device 101 may infer the touch input at the plurality of contact points as the first gesture, based on a higher probability. For example, the first graph 410 may be indicated based on Equation 1.

$$p = 1 - \frac{1}{4v + 2} \qquad \text{[Equation 1]}$$

Referring to the Equation 1, P may refer to the probability corresponding to the first gesture. They may refer to the moving speed of the center point. The electronic device 101 according to an embodiment may obtain the probability matching the first gesture based on identifying the moving speed of the center point by using the Equation 1. The electronic device 101 according to an embodiment may change at least a portion of the distance (e.g., the distances 261, 271, and 281 of FIG. 2B) between the plurality of contact points in a state of identifying that the touch input by the plurality of contact points is related to the first gesture. An operation of at least partially changing the distance by the electronic device 101 will be described below with reference to FIG. 6.

The second graph 420 according to an embodiment may be an example of a graph that is inversely proportional to the moving speed of the center point. For example, referring to the second graph 420, as the moving speed of the center point increases, the probability of being identified as the second gesture may be lower. For example, based on identifying that the moving speed of the center point is increased, the electronic device 101 may infer the touch input at the plurality of contact points as the second gesture based on the probability lower than the probability of identifying as the first gesture. For example, the second graph 420 may be indicated based on Equation 2.

$$p' = \frac{1}{4v + 2} \qquad \text{[Equation 2]}$$

Referring to the Equation 2, the p' may refer to the probability corresponding to the second gesture. The v may refer to the moving speed of the center point. The electronic device 101 according to an embodiment may obtain the probability that the touch input at the plurality of contact points matches the second gesture based on identifying the moving speed of the center point by using the Equation 2. The electronic device 101 according to an embodiment may change at least a portion of the center points corresponding to the plurality of contact points in a state of identifying that the touch input by the plurality of contact points is related to the second gesture. An operation in which the electronic device 101 changes the at least a portion of the center points will be described below with reference to FIG. 6.

The electronic device 101 according to an embodiment may perform an operation related to at least one of the first gesture and the second gesture based on changing at least one of the distance and the center point related to the plurality of contact points. For example, the electronic device 101 may obtain a parameter for performing the operation based on probabilities respectively corresponding to the first gesture or the second gesture. The parameter may refer, for example, to a degree to which at least one of the first gesture and/or the second gesture affects the operation. An operation in which the electronic device 101 obtains the parameter based on the obtained probabilities will be described below with reference to FIG. 5.

As described above, the electronic device 101 according to an embodiment may identify the touch input by the plurality of contact points using the touch sensor. Based on identifying the touch input at the plurality of contact points, a specified trajectory may be identified. The electronic device 101 may identify one or more gestures based on identifying the specified trajectory during a specified time. The electronic device 101 may identify the first gesture matching the user intention among the one or more gestures and the second gesture different from the first gesture, using probability data included in the graph 400. The electronic device 101 may perform at least one event using the parameter corresponding to the first gesture and the second gesture.

Figure 5:
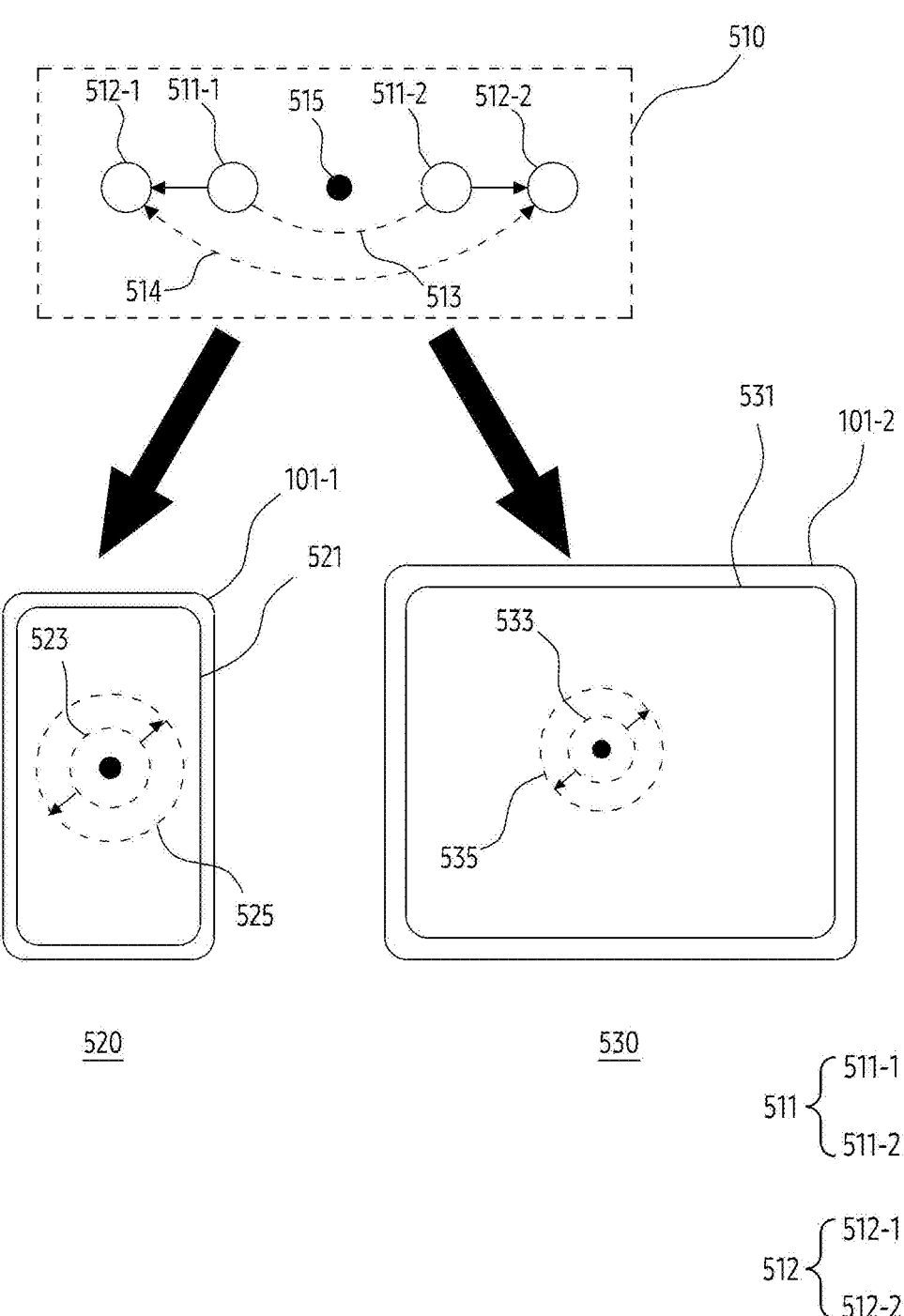
FIG. 5 is a diagram illustrating an example electronic device that performs an operation with respect to a gesture based on an influence level, according to various embodiments.

FIG. 5 is a diagram illustrating an example electronic device that performs an operation with respect to a gesture based on an influence level, according to various embodiments. An electronic device 101-1 of FIG. 5 and/or an electronic device 101-2 of FIG. 5 may be an example of the electronic device 101 of FIG. 1. For example, a size of a display 531 of the electronic device 101-2 may be different from a size of the display 521 of the electronic device 101-1. As an example, the size of the display 531 may be larger than the size of the display 521.

Referring to FIG. 5, the electronic device 101 according to an embodiment may identify at least one gesture using a touch sensor. The at least one gesture 510 may be referred to as the gesture 203 of FIG. 2A. For example, a distance 514 between contact points 512-1 and 512-2 may include a value different from a distance 513. For example, the distance 514 may include a value greater than or equal to the distance 513. As an example, the distance 514 may include a value that is twice the distance 513.

The electronic device 101 according to an embodiment may perform an event corresponding to the gesture 510 identified by the touch sensor (e.g., the touch sensor 310 of FIG. 3) according to a size and/or a touch sensing area of a display (e.g., the display 320 of FIG. 3). For example, electronic device 101 may perform the event based on a parameter for the gesture 510. As an example, the parameter may, for example, indicate a degree to which the identified gesture affects the event performed by the electronic device 101. As an example, the parameter may include at least one value between 0 and 1. The electronic device 101 may obtain the parameter by using Equation 3.

$$a = e(t) * p'/s(i) \qquad \text{[Equation 3]}$$

Referring to the Equation 3, the a may refer to the degree that affects the event performed by the electronic device 101 based on the gesture identified by the touch sensor. The e(t) may refer to information on time. For example, the information on the time may refer to a time interval for the electronic device 101 to identify contact points included in the at least one gesture. As an example, the information on the time may be a value obtained by dividing a value (e.g., 8.3 ms) specified at the time interval. As an example, the e(t) may correspond to at least one value among 1 to 2. The p' may be referred to in the p' of FIG. 4. The s(i) may refer to information related to the size of the display. As an example, the s(i) may include at least one value among 0.5 to 1. For example, based on obtaining the parameter (e.g., 1) for the gesture 510, the electronic device 101 may expand (e.g., double) a screen on the display based on the parameter by identifying the distance 514, which is twice the distance 513. However, it is not limited thereto.

The electronic device 101-1 and the electronic device 101-2 according to an embodiment may identify the gesture 510 based on the same time interval. A screen displayed on the display 521 of the electronic device 101-1 may include information substantially similar to a screen displayed on the display 531 of the electronic device 101-2. For example, the parameter for the gesture 510 (e.g., the a of the Equation 3) may differ based on the size of each of the displays 521 and 531.

For example, in a state 520, the electronic device 101-1 may adjust a size of an area of the screen displayed on the display 521 based on identifying the gesture 510. For example, the electronic device 101-1 may enlarge a size of a screen displayed in an area 523 to be displayed in an area 525. A size of the areas 523 and 525 may be adjusted based on the distances 513 and 514 and/or the parameter (e.g., the a of the Equation 3).

For example, in a state 530, the electronic device 101-2 may adjust a size of an area of the screen displayed on the display 531 based on identifying the gesture 510. For example, the electronic device 101-2 may enlarge a size of a screen displayed in an area 533 to display in an area 535. A size of the areas 533 and 535 may be adjusted based on the distances 513 and 514 and/or the parameter (e.g., the a of the Equation 3).

For example, the size of the areas 523 and 533 based on contact points 511 may be substantially similar. For example, the size of the areas 525 and 535 based on contact points 512 may differ based on the parameter. However, it is not limited to the above-described embodiment.

The electronic device 101 according to an embodiment may at least partially correct a performance of the event corresponding to the at least one gesture based on the probability (e.g., the p' of the Equation 2) obtained through the graph 400 of FIG. 4 by using the Equation 2. An operation in which the electronic device 101 at least partially corrects the performance of the event based on the Equation 3 will be described below with reference to FIG. 6.

As described above, the electronic device 101 may control a performance of an operation with respect to the gesture based on at least one parameter. For example, the parameter may be obtained based on the probability indicating the identification of the gesture based on the touch input by the plurality of contact points, a specified time interval, and/or the size of the display of the electronic device 101. The electronic device 101 may provide a more convenient user interface (UI) to the user by adjusting the performance of the operation with respect to the gesture based on obtaining the parameter.

Figure 6:
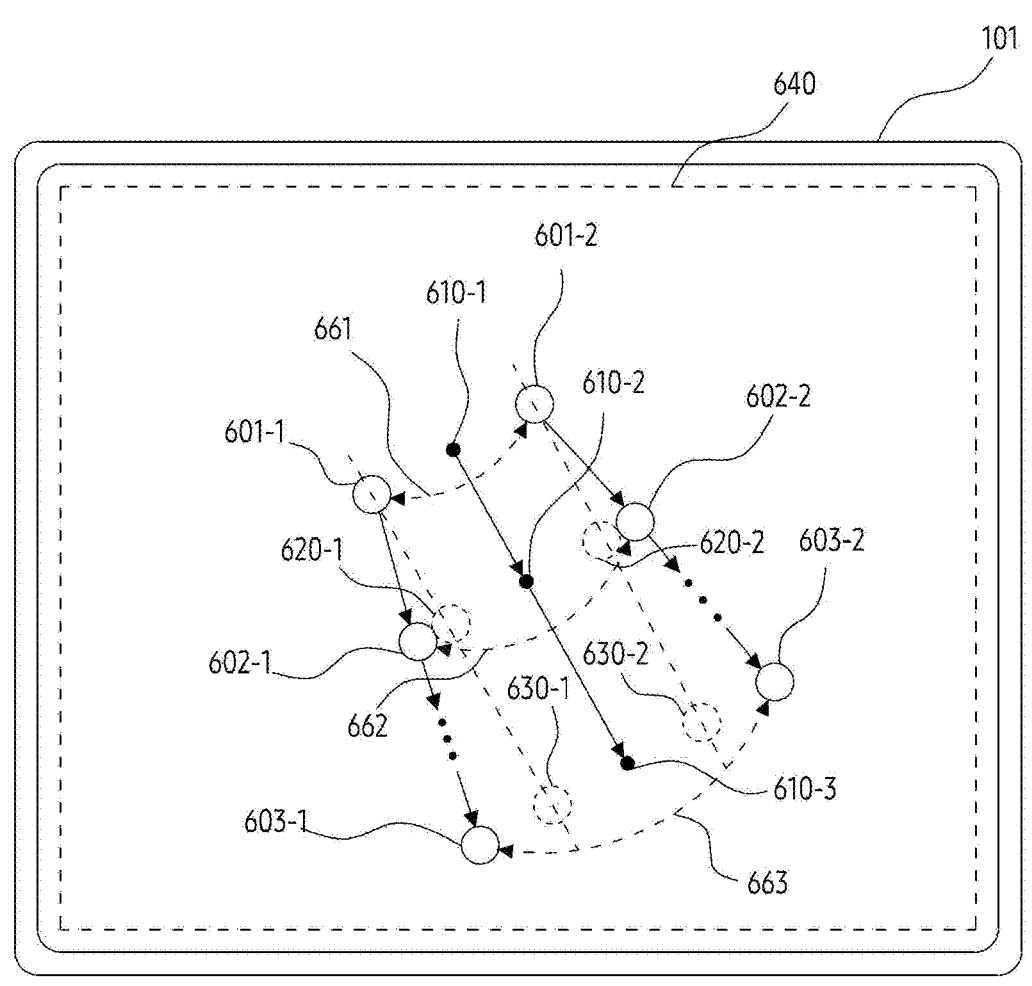
FIG. 6 is a diagram illustrating an example operation in which an example electronic device corrects at least a portion of a gesture based on an influence level, according to various embodiments.

FIG. 6 is a diagram illustrating an operation in which an example electronic device corrects at least a portion of a gesture based on an influence level, according to various embodiments. An electronic device 101 of FIG. 6 may be an example of the electronic device 101 of FIG. 1 and/or the electronic device 101 of FIG. 2A.

Referring to FIG. 6, the electronic device 101 according to an embodiment may obtain a touch input by contact points 601, 602, and 603, based on a specified time interval by using a touch sensor (e.g., the touch sensor 310 of FIG. 3). For example, the electronic device 101 may identify a first input with respect to contact points 601-1 and 601-2 at a first time point of the specified time interval. For example, the electronic device 101 may identify a second input by the contact points 602-1 and 602-2 at a second time point of the specified time interval. For example, the electronic device 101 may identify an n-th input by contact points 603-1 and 603-2 at an n-th time point of the specified time interval.

For example, the electronic device 101 may obtain center points 610 and/or distances 661, 662, and 663 corresponding to each of the contact points 601, 602, and 603 based on identifying the first input, the second input, and/or the n-th input. For example, the electronic device 101 may identify a change in a position of the center points 610-1, 610-2, and 610-3, and/or the distances 661, 662, and 663, obtained based on the specified time interval. As an example, the distances 662 and 663 may be different from the distance 661.

For example, the electronic device 101 may identify one or more gestures (e.g., the gesture 203 of FIG. 2A or the gesture 253 of FIG. 2B) based on identifying the change in the position of the center points and/or the distance.

The electronic device 101 according to an embodiment may obtain a probability corresponding to the one or more gestures using probability data (e.g., the probability data included in the graph 400 of FIG. 4). For example, the electronic device 101 may identify a gesture 640 based on a probability of a first gesture (e.g., the gesture 253 of FIG. 2B) corresponding to the first graph 410 of FIG. 4 and/or a probability of a second gesture (e.g., the gesture 203 of FIG. 2A) corresponding to the second graph 420 of FIG. 4. As an example, the gesture 640 may be at least partially similar to the gesture 253 of FIG. 2B.

The electronic device 101 according to an embodiment may change a specified trajectory corresponding to the gesture 640 by using a parameter with respect to the second gesture based on a relatively low probability. For example, the electronic device 101 may use Equation 4 to change the specified trajectory.

$$g'(n) = g(n)*a + g'(n-1)*(1-a) \qquad \text{[Equation 4]}$$

Referring to the Equation 4, for example, the g'(n), may refer to a corrected data value. The g(n) may refer to a data value identified by the electronic device 101. The a may be referred to the a of the Equation 3. The n may refer to information on a time interval. The g'(n−1) may refer to a corrected data value prior to the g'(n).

The electronic device 101 according to an embodiment may change a portion of the trajectory corresponding to the gesture 640 using the Equation 4. For example, the electronic device 101 may change each of the distances to be less than the distances 661, 662, and 663 between the contact points 601, 602, and 603. For example, the electronic device 101 may respectively change a position of the contact points 602-1 and 602-2 to be positioned at different points 620-1 and 620-2. For example, a distance between the different points 620-1 and 620-2 may correspond to a value less than the distance 662. For example, the distance between the different points 620-1 and 620-2 may be similar to the distance 661.

For example, the electronic device 101 may respectively compensate for a position of the contact points 603 to be positioned at different points 630-1 and 630-2. For example, a distance between the different points 630-1 and 630-2 may be less than the distance 663. For example, the distance between the different points 630-1 and 630-2 may be similar to the distance 661.

Although not illustrated, in a case that the probability with respect to the second graph 420 of FIG. 4 is relatively higher than the probability with respect to the first graph 410 of FIG. 4, the electronic device 101 according to an embodiment may correct a specified trajectory of the second gesture different from the first gesture, based on a parameter with respect to the first gesture (e.g., the gesture 253 of FIG. 2B) corresponding to the first graph. For example, the electronic device 101 may identify a movement of a center point by a movement of contact points included in the second gesture. For example, the electronic device 101 may change a position of the center point to be less than a distance from which the center point is moved based on the movement of the identified center point. However, it is not limited to the above-described embodiment.

The electronic device 101 according to an embodiment may store the data value corrected using the Equation 4, as a resource file based on an operating system included in the electronic device 101. For example, the data value may be indicated by Table 1.

TABLE 1

| Time Interval | Distance between Contact Points | Probability (e.g., Second Graph 420 of FIG. 4) | Parameter (e.g. α of Equation 3) | Corrected Distance between Contact Points |
|---|---|---|---|---|
| First Time Point | 744.4255 | 0.1 | 0.05 | 744.4255 |
| Second Time Point | 578.6548942 | 0.11 | 0.055 | 735.3081167 |
| . . . | . . . | . . . | . . . | . . . |

TABLE 1-continued

| Time Interval | Distance between Contact Points | Probability (e.g., Second Graph 420 of FIG. 4) | Parameter (e.g. α of Equation 3) | Corrected Distance between Contact Points |
|---|---|---|---|---|
| N-1th Time Point | 521.2452412 | 0.06 | 0.03 | 626.7698621 |
| N th Time Point | 614.2818352 | 0.07 | 0.035 | 626.3327812 |

Referring to the Table 1, the electronic device 101 according to an embodiment may obtain contact points based on the specified time interval. For example, the electronic device 101 may identify a distance (e.g., the distance 663) between the obtained contact points, a probability, and/or a parameter at the n-th time point. The electronic device 101 may change the distance between the contact points using the Equation 4. For example, the electronic device 101 may identify a distance (e.g., 744.4255) between the contact points at a first time point. For example, at a second time point, based on a distance between the identified contact points (e.g., 578.6548942), a probability (e.g., 0.11), and/or a parameter (e.g., 0.55), the electronic device 101 may obtain a distance (e.g., 735.3081167) in which the distance is corrected. The corrected distance may be similar to the distance between the identified contact points at the first time point, other than the distance between the identified contact points. However, it is not limited to the data values included in the Table 1 described above. The electronic device 101 according to an embodiment may perform an event corresponding to the gesture 640 by changing the trajectory of the gesture 640. For example, based on changing at least one of a distance or a center point between contact points, the electronic device 101 may execute an event related to at least one of the first gesture (e.g., the gesture 253 of FIG. 2B) or the second gesture (e.g., the gesture 203 of FIG. 2A) based on an application executed by a processor (e.g., the processor 120 of FIG. 3). For example, the electronic device 101 may control a screen displayed through a display based on the executed event. As an example, the event may be referred to as screen scrolling. For example, the electronic device 101 may perform the screen scrolling more naturally by changing the trajectory of the gesture 640.

As described above, the electronic device 101 according to an embodiment may obtain contact points based on the specified time interval. The electronic device 101 may identify a plurality of gestures based on a position of the obtained contact points. The electronic device 101 may identify the first gesture (e.g., the gesture 253 of FIG. 2B) based on a higher probability using probability data, among the plurality of gestures. The electronic device 101 may obtain an influence level (or parameter) with respect to the second gesture (e.g., the gesture 203 of FIG. 2A) different from the first gesture among the plurality of gestures, based on the Equation 3. For example, the electronic device 101 may change the position of the contact points based on the obtained influence level with respect to the second gesture. The electronic device 101 may perform an event corresponding to the first gesture to be suitable to a user intention by changing the position of the contact points.

Figure 7:
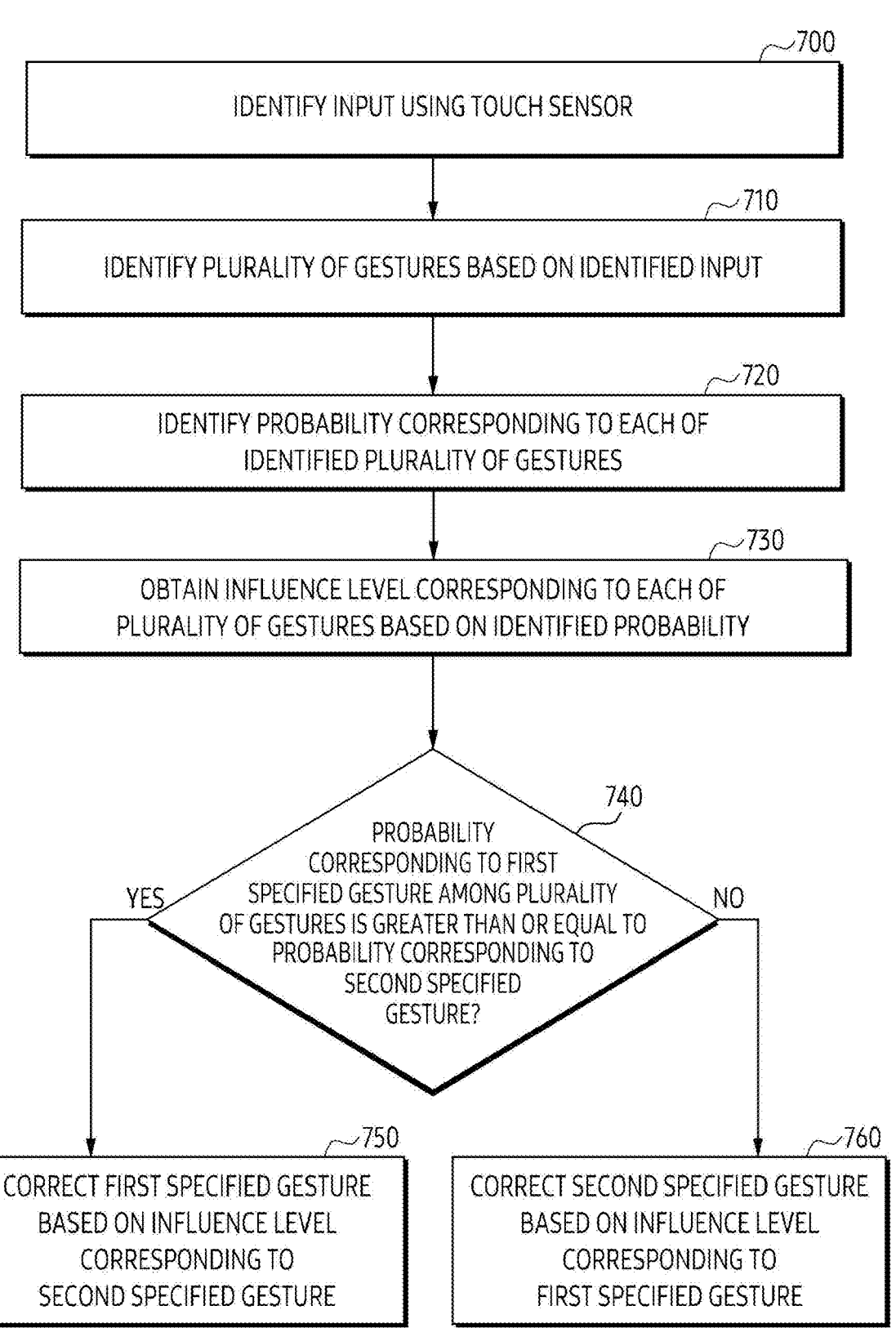
FIG. 7 is a flowchart illustrating an example operation in which an example electronic device corrects at least a portion of a plurality of gestures based on an input, according to various embodiments.

FIG. 7 is a flowchart illustrating an example operation in which an example electronic device corrects at least a portion of a plurality of gestures based on an input, according to various embodiments. At least one of operations of FIG. 7 may be performed by the electronic device 101 of FIG. 1 and/or the processor 120 of FIG. 1.

Referring to FIG. 7, in operation 700, a processor according to an embodiment may identify an input using a touch sensor. For example, the input may be one or more. For example, the processor may identify one or more inputs based on a specified time interval.

Referring to FIG. 7, in operation 710, the processor according to an embodiment may identify a plurality of gestures based on the identified input. For example, the plurality of gestures may include at least one of the gesture 203 of FIG. 2A and/or the gesture 253 of FIG. 2B. For example, the plurality of gestures may be identified based on the number and/or a position of one or more contact points.

Referring to FIG. 7, in operation 720, the processor according to an embodiment may identify a probability corresponding to each of the identified plurality of gestures. For example, the processor may identify the probability corresponding to each of the plurality of gestures using the probability data included in the graph 400 of FIG. 4. The probability may be different for each of the plurality of gestures.

Referring to FIG. 7, in operation 730, the processor according to an embodiment may obtain an influence level corresponding to each of the plurality of gestures based on the identified probability. The influence level may refer, for example, to the a of the Equation 3 of FIG. 5. For example, the processor may obtain an influence level with respect to a gesture based on a relatively low probability among the plurality of gestures. However, it is not limited thereto.

Referring to FIG. 7, in operation 740, the processor according to an embodiment may identify whether a probability corresponding to a first specified gesture among the plurality of gestures is greater than or equal to a probability corresponding to a second specified gesture. For example, the first specified gesture may be a gesture corresponding to the second graph 420 of FIG. 4. For example, the first specified gesture may be referred to the gesture 203 of FIG. 2A. For example, the second specified gesture may be a gesture corresponding to the first graph 410 of FIG. 4. For example, the second specified gesture may be referred to the gesture 253 of FIG. 2B. For example, the processor may perform operation 740 using the probability data included in the graph 400 of FIG. 4.

Referring to FIG. 7, in a case that the probability corresponding to the first specified gesture is greater than or equal to the probability corresponding to the second specified gesture (the operation 740—YES), in operation 750, the processor according to an embodiment may correct the first specified gesture based on an influence level corresponding to the second specified gesture. For example, the processor may change a position of center points between contact points configuring the first specified gesture. For example, the processor may at least partially refrain from performing an operation corresponding to the second specified gesture by changing the position of the center points. For example, the processor may provide a more accurate operation corresponding to the first specified gesture to a user who intends to perform the operation corresponding to the first specified gesture, by at least partially refraining from performing the operation corresponding to the second specified gesture.

Referring to FIG. 7, in a case that the probability corresponding to the first specified gesture is less than the probability corresponding to the second specified gesture (the operation 740—NO), in operation 760, the processor according to an embodiment may correct the second specified gesture based on an influence level corresponding to the first specified gesture. For example, the processor may change a trajectory of the second specified gesture to perform the correction. For example, a position of at least a portion of a plurality of contact points corresponding to the second specified gesture may be adjusted. The trajectory of the second specified gesture may be partially indicated based on a straight line by adjusting the position of the at least a portion. The processor may execute an event corresponding to the second specified gesture by correcting the second specified gesture. For example, the processor may at least partially refrain from performing the operation based on the first specified gesture by changing the trajectory of the second specified gesture.

The electronic device according to an embodiment may identify one or more gestures using the touch sensor. The electronic device may identify a gesture matching a user intention based on using a probability based on a movement of contact points among the identified one or more gestures.

The electronic device according to an embodiment may identify the one or more gestures using the touch sensor. A method for the electronic device to identify the gesture that satisfies a user intention among the identified one or more gestures is required.

As described above, an electronic device 101 according to an example embodiment may include a touch sensor 310 and a processor 120. The processor may be configured to, based on a touch input at a plurality of contact points 210, 220, 230, 260, 270, 280, 511, 512, 601, 602, or 603 contacted on the touch sensor, identify a distance 211, 221, 222, 261, 271, 281, 513, 514, 661, 662, or 663 between the plurality of contact points, and a center point 205, 255, 515, or 510 of the plurality of contact points. The processor may be configured to, based on a speed of the center point by a movement of the contact points, obtain probabilities 410 and 420 in which the touch input may correspond to each of a first specified gesture 203 related to the distance and a second specified gesture 253 related to a movement of the center point. The processor may be configured to, based on the probabilities, change at least one of the distance or the center point.

For example, the processor may be configured to change the center point of the distance or the center point in a state in which the touch input being related to the first specified gesture is identified based on the probabilities.

For example, the processor may be configured to, based on the probabilities that are inversely proportional to the speed of the center point, identify that the touch input is related to the first specified gesture.

For example, the processor may be configured to change the distance of the distance or the center point in another state in which the touch input being related to the second specified gesture is identified based on the probabilities.

For example, the processor may be configured to, based on the probabilities that are proportional to the speed of the center point, identify that the touch input is related to the specified gesture.

For example, the processor may be configured to change the distance to be below a distance between the contact points.

For example, the processor may be configured to identify the movement of the center point by the movement of the contact points. The processor may be configured to, based on the identified movement of the center point, change the center point to be below a distance in which the center point is moved.

For example, the processor may be configured to, based on a specified time interval, identify the movement of the contact points.

For example, the processor may be configured to, based on changing at least one of the distance or the center point, execute an event related to at least one of the first specified gesture or the second specified gesture, based on an application executed by the processor.

For example, the processor may be configured to, based on a size of a touch sensing area based on the touch sensor, change at least one of the distance or the center point.

As described above, a method of an electronic device 101 according to an embodiment may include, based on a touch input at a plurality of contact points 210, 220, 230, 260, 270, 280, 511, 512, 601, 602, or 603 contacted on a touch sensor 310, identifying a distance 211, 221, 222, 261, 271, 281, 513, 514, 661, 662, or 663 between the plurality of contact points, and a center point 205, 255, 515, or 510 of the plurality of contact points. The method may include, based on speed of the center point by a movement of the contact points, obtaining probabilities 410 and 420 in which the touch input corresponds to each of a first specified gesture 203 related to the distance and a second specified gesture 253 related to a movement of the center point. The method may include, based on the probabilities, changing at least one of the distance or the center point.

For example, the method may include changing the center point of the distance or the center point in a state where the touch input being related to the first specified gesture is identified based on the probabilities.

For example, the method may include, based on the probabilities that are inversely proportional to the speed of the center point, identifying that the touch input is related to the first specified gesture.

For example, the method may include changing the distance of the distance or the center point in another state in which the touch input being related to the second specified gesture is identified based on the probabilities.

For example, the method may include, based on the probabilities that are proportional to the speed of the center point, identifying that the touch input is related to the second specified gesture.

For example, the method may include changing the distance to be below a distance between the contact points.

For example, the method may include identifying the movement of the center point by the movement of the contact points. The method may include, based on the identified movement of the center point, changing the center point to be below a distance in which the center point is moved.

For example, the method may include, based on a specified time interval, identifying the movement of the contact points.

For example, the method may include, based on changing at least one of the distance or the center point, executing an event related to at least one of the first specified gesture or the second specified gesture, based on an application executed by a processor.

For example, the method may include, based on a size of a touch sensing area based on the touch sensor, changing at least one of the distance or the center point.

As described above, one or more programs of one or more non-transitory computer-readable storage media storing the one or more programs according to an embodiment may be configured to, when executed by a processor 120 of an electronic device 101, based on a touch input at a plurality of contact points 210, 220, 230, 260, 270, 280, 511, 512, 601, 602, or 603 contacted on a touch sensor 310, identify a distance 211, 221, 222, 261, 271, 281, 513, 514, 661, 662, or 663 between the plurality of contact points, and a center point 205, 255, 515, or 510 of the plurality of contact points. The one or more programs may be configured to, based on speed of the center point by a movement of the contact points, obtain probabilities 410 and 420 in which the touch input corresponds to each of a first specified gesture 203 related to the distance and a second specified gesture 253 related to a movement of the center point. The one or more programs may be configured to, based on the probabilities, change at least one of the distance or the center point.

For example, the one or more programs may be configured to, when executed by the processor, change the center point of the distance or the center point in a state in which the touch input being related to the first specified gesture is identified based on the probabilities.

For example, the one or more programs may be configured to, when executed by the processor, based on the probabilities that are inversely proportional to the speed of the center point, identify that the touch input is related to the first specified gesture.

For example, the one or more programs may be configured to, when executed by the processor, change the distance of the distance or the center point in another state in which the touch input being related to the second specified gesture is identified based on the probabilities.

For example, the one or more programs may be configured to, when executed by the processor, based on the probabilities that are proportional to the speed of the center point, identify that the touch input is related to the second specified gesture.

For example, the one or more programs may be configured to, when executed by the processor, change the distance to be below a distance between the plurality of contact points.

For example, the one or more programs may be configured to, when executed by the processor, identify the movement of the center point by the movement of the contact points. The one or more programs may be configured to, when executed by the processor, based on the identified movement of the center point, change the center point to be below a distance in which the center point is moved.

For example, the one or more programs may be configured to, when executed by the processor, based on a specified time interval, identify the movement of the contact points.

For example, the one or more programs may be configured to, when executed by the processor, based on changing at least one of the distance or the center point, execute an event related to at least one of the first specified gesture or the second specified gesture, based on an application executed by the processor.

For example, the one or more programs may be configured to, when executed by the processor, based on a size of a touch sensing area based on the touch sensor, change at least one of the distance or the center point.

The device described above may be implemented as a hardware component, a software component, and/or a combination of the hardware component and the software component. For example, the device and the component described in embodiments may be implemented by using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing and responding to an instruction. A processing device (including, e.g., processing circuitry) may perform an operating system (OS), and one or more software applications executed on the operating system. In addition, the processing device may access, store, manipulate, process and generate data in response to the execution of the software. For the convenience of understanding, one processing device is sometimes described as being used, but a person who has ordinary knowledge in the relevant technical field will understand that the processing device may include a plurality of processing elements and/or a plurality of types of processing elements. For example, the processing device may include a plurality of processors or one processor and one controller. In addition, another processing configuration, such as a parallel processor, is also possible.

Software may include a computer program, code, an instruction, or a combination of one or more thereof, and may configure a processing device to operate as desired or command the processing device independently or collectively. The software and/or data may be embodied in any type of a machine, a component, a physical device, a computer storage medium or a device, in order to be interpreted by the processing device, or to provide the instruction or the data to the processing device. The software may be distributed on a network-connected computer system, and may be stored or executed in a distributed manner. The software and the data may be stored in one or more computer-readable recording media.

A method according to an embodiment recorded on a computer-readable medium by being implemented in a form of a program command that may be performed through various computer devices. In this case, the medium may continuously store a computer-executable program or temporarily store it for execution or download. In addition, the medium may be various recording media or storage in a form of a single or several hardware coupled, but is not limited to media directly connected to a certain computer system, and may exist distributed on a network. An example of the media may include a magnetic medium such as a hard disk, a floppy disk and a magnetic tape, an optical recording medium such as a CD-ROM and a DVD, magneto-optical medium such as a floptical disk, and ROM, RAM, flash memory, and the like, which are configured to store program instructions. In addition, as an example of other media, there are also recording media or storage media managed by an app store that distributes an application, a site that supplies or distributes various software, a server, and the like.

Although the embodiments have been described according to limited embodiments and drawings as described above, a person who has ordinary knowledge in the relevant technical field is capable of various modifications and transform from the above description. For example, an appropriate result may be achieved even if the described technologies are performed in a different order from the described method, and/or components of the described system, structure, device, circuit, and the like coupled or combined in a form different from the described method, or substituted or replaced by another component or an equivalent. It will also be understood that any of the embodiment(s) described herein may be used in conjunction with any other embodiment(s) described herein.

Therefore, other implementations, other embodiments, and equivalents to the scope of the claims are in the scope of the claims.

What is claimed is:

1. An electronic device comprising:
a touch sensor, and
at least one processor comprising processing circuitry, and
memory comprising one or more storage media storing instructions,
wherein the instructions, when executed by the at least one processor individually or collectively, cause the electronic device to:
    based on a touch input at a plurality of contact points contacted on the touch sensor, identify a distance between the plurality of contact points, and a center point of the plurality of contact points,
    based on a speed of the center point by a movement of the contact points, obtain probabilities in which the touch input corresponds to each of a first specified gesture related to the distance and a second specified gesture related to a movement of the center point, and
    based on the probabilities, change at least one of the distance or the center point.

2. The electronic device of claim 1,
wherein instructions, when executed by the at least one processor individually or collectively, cause the electronic device to:
    change the center point of the distance or the center point in a state in which the touch input being related to the first specified gesture is identified based on the probabilities.

3. The electronic device of claim 2,
wherein instructions, when executed by the at least one processor individually or collectively, cause the electronic device to:
    based on the probabilities being inversely proportional to the speed of the center point, identify that the touch input is related to the first specified gesture.

4. The electronic device of claim 1,
wherein instructions, when executed by the at least one processor individually or collectively, cause the electronic device to:
    change the distance of the distance or the center point in another state in which the touch input being related to the second specified gesture is identified based on the probabilities.

5. The electronic device of claim 4,
wherein instructions, when executed by the at least one processor individually or collectively, cause the electronic device to:
    based on the probabilities being proportional to the speed of the center point, identify that the touch input is related to the second specified gesture.

6. The electronic device of claim 1,
wherein instructions, when executed by the at least one processor individually or collectively, cause the electronic device to:
    change the distance to be below a distance between the plurality of contact points.

7. The electronic device of claim 1,
wherein instructions, when executed by the at least one processor individually or collectively, cause the electronic device to:
    identify the movement of the center point by the movement of the contact points, and
    based on the identified movement of the center point, change the center point to be below a distance in which the center point is moved.

8. The electronic device of claim 1,
wherein instructions, when executed by the at least one processor individually or collectively, cause the electronic device to:
    based on a specified time interval, identify the movement of the contact points.

9. The electronic device of claim 1,
wherein instructions, when executed by the at least one processor individually or collectively, cause the electronic device to:
    based on changing at least one of the distance or the center point, execute an event related to at least one of the first specified gesture or the second specified gesture, based on an application executed by the processor.

10. The electronic device of claim 1,
wherein instructions, when executed by the at least one processor individually or collectively, cause the electronic device to:
    based on a size of a touch sensing area based on the touch sensor, change at least one of the distance or the center point.

11. A method of an electronic device, comprising:
based on a touch input at a plurality of contact points contacted on a touch sensor, identifying a distance between the plurality of contact points, and a center point of the plurality of contact points,
based on a speed of the center point by a movement of the contact points, obtaining probabilities in which the touch input corresponds to each of a first specified gesture related to the distance and a second specified gesture related to a movement of the center point, and
based on the probabilities, changing at least one of the distance or the center point.

12. The method of claim 11, comprising:
changing the center point of the distance or the center point in a state in which the touch input being related to the first specified gesture is identified based on the probabilities.

13. The method of claim 12, comprising:
based on the probabilities being inversely proportional to the speed of the center point, identifying that the touch input is related to the first specified gesture.

14. The method of claim 11, comprising:
changing the distance of the distance or the center point in another state in which the touch input being related to the second specified gesture is identified based on the probabilities.

15. The method of claim 14, comprising:
based on the probabilities being proportional to the speed of the center point, identifying that the touch input is related to the second specified gesture.

16. The method of claim 11, comprising:
changing the distance to be below a distance between the plurality of contact points.

17. The method of claim 11, comprising:
identifying the movement of the center point by the movement of the contact points, and based on the identified movement of the center point, changing the center point to be below a distance in which the center point is moved.

18. The method of claim 11, comprising:

based on a specified time interval, identifying the movement of the contact points.

19. The method of claim 11, comprising:

based on changing at least one of the distance or the center point, executing an event related to at least one of the first specified gesture or the second specified gesture, based on an application executed by a processor.

20. The method of claim 11, comprising:

based on a size of a touch sensing area based on the touch sensor, changing at least one of the distance or the center point.

* * * * *